(12) United States Patent
Wang et al.

(10) Patent No.: US 8,050,342 B2
(45) Date of Patent: Nov. 1, 2011

(54) METHOD AND APPARATUS FOR RECEIVING CODED SIGNALS WITH THE AID OF CHANNEL STATE INFORMATION

(75) Inventors: Zhongjun Wang, Singapore (SG); Lee Guek Yeo, Singapore (SG); Zhi Ping Li, Singapore (SG); Saigui Hu, Singapore (SG); Yanxin Yan, Singapore (SG); Qi Jun Xu, Singapore (SG); Yu Jing Ting, Singapore (SG); Masayuki Tomisawa, Singapore (SG)

(73) Assignee: Wipro Techno Centre (Singapore) Pte Ltd, Singapore (SG)

( * ) Notice: Subject to any disclaimer, the term of this patent is extended or adjusted under 35 U.S.C. 154(b) by 567 days.

(21) Appl. No.: 12/233,064

(22) Filed: Sep. 18, 2008

(65) Prior Publication Data

US 2009/0074050 A1     Mar. 19, 2009

(30) Foreign Application Priority Data

Sep. 18, 2007  (CN) .......................... 2007 1 0153993

(51) Int. Cl.
*H03K 5/159* (2006.01)
(52) U.S. Cl. .......................... 375/260; 375/232; 375/229
(58) Field of Classification Search ................. 375/260, 375/350, 341, 346, 232, 229, 230
See application file for complete search history.

(56) References Cited

U.S. PATENT DOCUMENTS

| | | | |
|---|---|---|---|
| 6,021,487 A * | 2/2000 | Maliszewski | 712/221 |
| 7,133,473 B1 * | 11/2006 | Lou et al. | 375/341 |
| 2007/0116141 A1 * | 5/2007 | Li et al. | 375/260 |
| 2007/0237244 A1 * | 10/2007 | Huang et al. | 375/260 |

OTHER PUBLICATIONS

Wenzhen Li, Zhongjun Wang, Yanxin Yan and Masayuki Tomisawa, "An efficient low-cost LS equalization in COFDM based UWB systems by utilizing channel-state information (CSI)", OKI Techno Centre (Singapore) Pte Ltd, IEEE, 2005.*
Stefan A. Fechtel and Alfred Blaickner, "Efficient FFT and Equalizer Implementation for OFDM Receivers", Infineon Technologies, Munich, Germany and Graz University of Technology, Graz, Austria, IEEEE, 1999.*
Yuan-Mao Chang, Cheng-Wei Kuang, Chien-Ching Lin, Tzu-Shien Sang, Hsie-Chia Chang and Chen-Yi Lee, "A new channel equalizer for OFDM-based wireless communications" Department of Electronics Engineering, National Chiao Tung University, Hsinchu, Taiwan, IEEE 2005.*

* cited by examiner

*Primary Examiner* — Chieh M Fan
*Assistant Examiner* — Aristocratis Fotakis
(74) *Attorney, Agent, or Firm* — Rabin & Berdo, P.C.

(57) ABSTRACT

Method and apparatus for receiving coded signals with the aid of CSI are provided. The method comprises: performing channel estimation to obtain a CFR estimation vector; computing a squared magnitude of the CFR estimation vector, and obtaining a normalization factor $\alpha$ by averaging the squared magnitudes of CFR estimations on all N subcarriers; finding a norm-shift operand m satisfying the condition that $\alpha_0 = 2^m$ is a power of 2 number closest to the normalization factor $\alpha$; performing a CSI-aided one-tap channel equalization on an output signal vector from a DFT processor by using the norm-shift operand m; performing constellation demapping; and performing channel decoding. The method further comprises obtaining a weighting factor vector by right shifting m bits of the squared magnitude of the CFR estimation vector so that the constellation demapping can use the weighted decision boundary values in case that its input signal is sensitive to both amplitude and phase.

16 Claims, 4 Drawing Sheets

METHOD AND APPARATUS FOR RECEIVING CODED SIGNALS WITH THE AID OF CHANNEL STATE INFORMATION

BACKGROUND OF THE INVENTION

1. Field of the Invention

The present invention relates to a method and apparatus for detecting and demapping coded signals in data communication and broadcasting systems, and more particularly to a method and apparatus for receiving and demodulating received signals with the aid of channel state information (CSI) in coded orthogonal frequency-division multiplexing (COFDM) based wireless communication and broadcasting systems.

2. Description of Related Art

COFDM has become a popular technique for transmission of signals over wired and wireless channels. COFDM has been adopted in several transmission standards such as digital audio broadcasting (DAB), digital video broadcasting (DVB), the IEEE 802.11a wireless local area network (WLAN) standard (see reference [1]: "WLAN MAC and PHY Specification: *High-speed Physical Layer in the 5 GHz Band*, IEEE Std 802.11a Supplement to IEEE Std Part 11, September 1999.") and the IEEE 802.16 wireless metropolitan area network (WMAN) standard (see reference [2]: "IEEE Standard for Local and Metropolitan Area Networks—Part 16: *Air Interface for Fixed Broadband Wireless Access Systems*, IEEE Std. 802.16, 2004."). Recently, multi-band COFDM based ultra wideband (UWB) systems have been proposed for achieving wireless transmission with very high data rate, as described in reference [3]: "WiMedia MBOA, *MultiBand OFDM Physical Layer Specification*, Ver. 1.1.5, Jul. 14, 2006". COFDM is also being pursued for dedicated short-range communications (DSRC) for road side to vehicle communications and as a potential candidate for fourth-generation (4G) mobile wireless systems.

In wireless communication and broadcasting systems, high-speed transmission of signals with wide bandwidth normally suffers from severe frequency selective fading. This can be avoided in an OFDM system by transforming the signal into a number of orthogonal components, each of these OFDM components having a bandwidth less than the coherence bandwidth of the transmission channel. By modulating these OFDM signal components onto different subcarriers, the transmission in each individual subcarrier experiences only frequency flat fading. The forward error correction (FEC) coding to transmitted information streams is thus employed to further combat the fading on OFDM subcarriers.

A typical COFDM baseband system is depicted in FIG. 1. In the transmitter, binary input data are encoded by an FEC channel encoder 1. Depending on the requirement of each individual application, the channel encoding can be convolutional coding, Turbo coding, low density parity check (LDPC) coding, or any other applicable FEC coding. The coding rate can be adjusted by puncturing the coded output bits to accommodate the desired data rate. After bit interleaving in a bit interleaver 2, the encoded binary data, $\{s(n)\}$, are mapped onto the modulation constellations in a modulation mapper 3. The modulation mode can be binary phase-shift keying (BPSK), quadrature phase-shift keying (QPSK), quadrature amplitude modulation (QAM), or whichever applicable. The constellation-mapped complex values, $\{x_k\}$ $k=0, 1, \ldots, N-1$, are then sent to an N-point inverse discrete Fourier transform (IDFT) processor 5 for further OFDM modulation. In some COFDM systems, such as in the recently published China national standard for digital television terrestrial broadcasting system (see reference [4]: "GB 20600-2006, China Standard, *Framing structure, channel coding and modulation for digital television terrestrial broadcasting system*, August 2006."), the constellation-mapped complex values may first be sent to a symbol interleaver 4 before the IDFT processing. Although whether or not to use a symbol interleaver in a COFDM system is case by case, a symbol interleaver 4 has been purposely included in the embodiments of this invention for demonstrating its generality, as shown in FIG. 1.

Referring to FIG. 1, in the receiver, after performing the appropriate timing and frequency synchronization, a discrete Fourier transform (DFT) processor 7 receives the OFDM symbol from a demultiplexer 6 and performs DFT so as to convert each time-domain OFDM symbol into N frequency-domain complex values, $\{y_k\}$ $k=0, 1, \ldots, N-1$. Ideally, these values should be same as $\{x_k\}$, but they are usually distorted by the transmission channel and receiver noise. Thus, before being used as the input to a symbol de-interleaver 9 and a modulation demapper 10, the distorted values, $\{y_k\}$, should be compensated first by an equalizer 8 so that the equalized values, $\{z_k\}$, are good estimates of $\{x_k\}$. The compensation is usually performed in frequency-domain by using the estimation of channel frequency response (CFR). After this coherent detection, $\{z_k\}$ orderly pass through the symbol de-interleaver 9 and the modulation demapper 10 for undertaking symbol de-interleaving and constellation demapping. Finally, the resultant values, $\{r(n)\}$, are bit-wise de-interleaved and channel decoded by a bit-wise de-interleaver 11 and a channel decoder 12, respectively, for recovery of the transmitted information bits. It should be noted that, here, the term "bit-wise de-interleaver" instead of "bit de-interleaver" has been used due to the fact that a soft-decision demapper is usually involved for enhancing the error correction capability of the subsequent channel decoder and thus the input to this de-interleaver, $\{r(n)\}$, may not be necessarily binary values.

As shown in FIG. 1, the transmission channel is modeled as a multipath fading channel with channel impulse response (CIR), h(t), and is corrupted by an additive noise, v(t). Using a discrete-time equivalent baseband model, h(t) and v(t) can be expressed as their frequency domain counterparts, h and v, respectively. Here, $h=[h_0, h_1, \ldots, h_{N-1}]^T$ is the CFR vector and $v=[v_0, v_1, \ldots, v_{N-1}]^T$ is a vector of independent identically distributed complex zero-mean Gaussian noise with variance $\sigma_v^2$. Let $x=[x_0, x_1, \ldots, x_{N-1}]^T$ be the transmitted signal vector (i.e., the input of IDFT), and $y=[y_0, y_1, \ldots, y_{N-1}]^T$ be the received vector (i.e., the output of DFT), the OFDM signal model can be simply expressed by $$y = Xh + v \qquad (1)$$

where X is a diagonal matrix whose diagonal contains the transmitted signal vector, x. In a COFDM receiver system, where coherent detection is necessary for providing the subsequent channel decoder with the properly demodulated constellation signals, the channel estimation and tracking are important. There exist several methods for estimating the CFR in an OFDM system. The simplest one is the well known least-square (LS) estimate which is given by $$\hat{h}_{ls} = X^{-1} y = \left[ \frac{y_0}{x_0} \quad \frac{y_1}{x_1} \quad \cdots \quad \frac{y_{N-1}}{x_{N-1}} \right]^T. \qquad (2)$$

Equalization based on the LS estimator of (2) is the result of an optimization based on the zero-forcing (ZF) criterion which aims at canceling intercarrier interference (ICI)

regardless of the noise level. To minimize the combined effect of ICI and additive noise, a more sophisticated solution called linear minimum mean-squared error (LMMSE) estimator can be used, as described in reference [5]: "J. J. van de Beek, O. Edfors, M. Sandell, S. K. Wilson, and P. O. Börjesson, "On channel estimation in OFDM systems," in *Proc. IEEE Vehicular Technology Conf.*, vol. 2, Chicago, Ill., July 1995, pp. 815-819". The LMMSE estimate of CFR h in (1), given the received data y and the transmitted symbols X, is $$\hat{h}_{lmmse} = R_{hh}[R_{hh} + \sigma_v^2 (XX^H)^{-1}]^{-1} \hat{h}_{ls} \qquad (3)$$

where the superscript $(\cdot)_H$ denotes Hermitian transpose and $R_{hh} = E\{hh^H\}$ is the channel autocorrelation matrix. The LMMSE estimator of (3) is of considerable complexity since inverting a matrix is required once the data in X are updated. The complexity can be reduced to some extent by adopting a simplified LMMSE estimator, as described in reference [6]: "O. Edfors, M. Sandell, J. J. van de Beek, S. K. Wilson, and P. O. Börjesson, "OFDM channel estimation by singular value decomposition," *IEEE Trans. Commun.*, vol. 46, July 1998, pp. 931-939". By assuming the same signal constellations on all subcarriers and equal probability on all constellation points and defining the average signal to noise ratio (SNR) as $E\{|x_k|^2\}/\sigma_v^2$, the simplified LMMSE estimator is given by $$\hat{h}_{lmmse} = R_{hh}\left(R_{hh} + \frac{\beta}{SNR}I\right)^{-1} \hat{h}_{ls} \qquad (4)$$

where I is the identity matrix and $\beta = E\{|x_k|^2\}E\{|1/x_k|^2\}$ is a constant depending on the signal constellation. Obviously, in addition to the high complexity, both LMMSE estimators of (3) and (4) require the knowledge of channel statistics $R_{hh}$ and SNR. This may prevent use of LMMSE in practical implementation when the required information either is unknown or can not be easily estimated. In reference [7]: "L. Deneire, P. Vandenameele, L. V d. Perre, B. Gyselinckx, and M. Engels, "A low complexity ML channel estimator for OFDM," *IEEE Trans. Commun.*, vol. 51, February 2003, pp. 135-140.", a maximum-likelihood (ML) estimator, which is of lower complexity and less dependence of the knowledge of $R_{hh}$ and SNR, was proposed. With the assumption of the channel order of L, the ML estimator takes the following form $$\hat{h}_{ml} = F_h (F_h^H F_h)^{-1} F_h^H \hat{h}_{ls} \qquad (5)$$

where $F_h$ represents the first L columns of a N×N DFT matrix, F. By this setting, the detrimental effect of additive noise to the CFR estimate can be substantially reduced but not completely removed. As a result, equalization using the ML channel estimator of (5) is usually superior to that using the LS estimator of (2), but is inferior to that using the LMMSE estimator of (3) or (4) in terms of signal recovery capability.

With the obtained channel estimation vector, $\hat{h} = [\hat{h}_0, \hat{h}_1, \ldots, \hat{h}_{N-1}]^T$, which can be one of $\hat{h}_{ls}$, $\hat{h}_{lmmse}$ and $\hat{h}_{ml}$, the frequency-domain equalization in a COFDM system takes the form of a complex divider bank at the DFT output in the receiver, i.e., $$z_k = y_k / \hat{h}_k, \ k=0, 1, \ldots, N-1. \qquad (6)$$

As a result, the equalizer used in a COFDM system is usually called one-tap equalizer.

A well-known issue involved in the equalization based on the LS estimator of (2) is that the ZF criterion does not have a solution if the channel transfer function has spectral nulls in the signal bandwidth. Inversion of the CFR requires an infinite gain and leads to infinite noise enhancement at those frequencies corresponding to spectral nulls, as described in reference [8]: "H. Sari, G. Karam, and I. Jeanclaude, "Transmission techniques for digital terrestrial TV broadcasting", *IEEE Commun. Mag.*, vol. 33, no. 2, February 1995, pp. 100-109.". Similar situation occurs when some subcarriers have experienced deep fading. To some extent, the equalization based on the ML estimator of (5) also suffers from the deep-fading caused problem since, as mentioned before, it has not taken full consideration of the effect of additive noise.

Inclusion of powerful FEC coding and interleaving in the OFDM system is the primary solution to overcome the problem of deep notches occurring in the received OFDM signal spectrum. With the availability of more and more powerful channel coding and decoding techniques (e.g., LDPC coding), this solution has proved to be very effective in practice. In addition, to make full use of the decoding capability of the channel decoder, the channel state information (CSI) aided decoding strategy has been suggested in some literature. Examples can be found in references: [8]-[14], [15]-[16], [17]-[19] when convolutional coding, Turbo coding and LDPC coding are used for FEC, respectively, wherein [9]: "M.-Y. Park and W.-C. Lee, "A demapping method using the pilots in COFDM systems," *IEEE Trans. Consumer Electronics*, vol. 44, no. 3, August 1998, pp. 1150-1153."; [10]: "W.-C. Lee, H.-M. Park, K.-J. Kang and K.-B. Kim, "Performance analysis of Viterbi decoder using channel state information in COFDM system," *IEEE Trans. Broadcasting*, vol. 44, no. 4, December 1998, pp. 488-496."; [11]: "W.-C. Lee, H.-M. Park and J.-S. Park, "Viterbi decoding method using channel state information in COFDM system," *IEEE Trans. Consumer Electronics*, vol. 45, no. 3, August 1999, pp. 533-537."; [12]: "S. Armour, A. Nix and D. Bull, "Use of linear transverse equalisers and channel state information in combined OFDM-equalization," in *Proc. IEEE Int. Symp. on Personal, Indoor and Mobile Radio Communications (PIMRC)*, vol. 1, London, UK, September 2000, pp. 615-619."; [13]: "M. R. G. Butler, S. Armour, P. N. Fletcher-, A. R. Nix, and D. R. Bull, "Viterbi decoding strategies for 5 GHz wireless LAN systems," in *Proc. IEEE 54th Veh. Technol. Conf*, VTC 2001—Fall, Atlantic City, USA, October 2001, pp. 77-81."; [14]: "Y. Wang, J. Ge, B. Ai, P. Liu and S. Y Yang, "A soft decision decoding scheme for wireless COFDM with application to DVB-T," *IEEE Trans. Consumer Electronics*, vol. 50, no. 1, February 2004, pp. 84-88."; [15]: "H. Shin, S. Kim, and J. H. Lee, "Turbo decoding in a Rayleigh fading channel with estimated channel state information," in. *Proc. IEEE 52nd Veh. Technol. Conf.*, VTC 2000—Fall, Boston, Mass., USA, September 2000, pp. 1358-1363."; [16]: "M. L. Ammari and F. Gagnon, "Iterative channel estimation and decoding of Turbo-coded OFDM symbols in selective Rayleigh channel," *Canadian Journal of Elect. Comput. Eng.*, vol. 32, no. 1, Winter 2007, pp. 9-18."; [17]: "H. Niu, M. Shen, J. A. Ritcey and H. Liu, "Iterative channel estimation and LDPC decoding over flat-fading channels," in *Proc. Conf. on Info. Sciences and Systems*, The Johns Hopkins University, Mar. 12-14, 2003."; [18]: "M.-K. Oh; Y-H. Kwon, J.-H. Park and D.-J. Park, "Blind iterative channel estimation and LDPC decoding for OFDM systems," in *Proc. IEEE 61st Veh. Technol. Conf*, VTC 2005-Spring, Stockholm, Sweden, 30 May-1 Jun. 2005, pp. 514-517."; and [19]: "H. Niu, M. Shen, J. A. Ritcey and H. Liu, "A factor graph approach to iterative channel estimation and LDPC decoding over fading channels," *IEEE Trans. Wireless Commun.*, vol. 4, no. 4, July 2005, pp. 1345-1350.".

FIG. 2 shows an apparatus 100 for receiving coded signals with the aid of CSI. The transmitted signal $y_k$ from a DFT processor 101, is applied to a CSI estimator 102 and a one-tap equalizer 103. In the one-tap equalizer 103, the transmitted signal $y_k$ is compensated by the estimate of CFR, $\hat{h}_k$, obtained from the CSI estimator 102. On the other hand, the CSI estimator 102 obtains the CSI estimation which is used in aid to the channel decoder 106 for achieving performance enhanced decoding. Denote by $\hat{c}_k$ the CSI estimation on subcarrier k. Depending on each individual algorithm used and/or system performance requirement, the CSI estimation on subcarrier k, $\hat{c}_k$, can be the squared magnitude of CFR, SNR, noise variance, channel estimation error variance on subcarrier k, or even their combination. It should be noted that, in FIG. 2, the one-tap equalization using CFR, $\hat{h}_k$, and the channel decoding with the aid of CSI estimation, $\hat{c}_k$, are performed separately.

The way to apply the CSI estimation to the decoding process depends on each type of channel decoder. When a convolutional encoder is adopted in the transmitter, the receiver performs maximum-likelihood sequence decoding using the well-known Viterbi algorithm, which searches for the most likely path (the path with the smallest metric, or Euclidian distance, from the received noisy and distorted signal) in the code trellis. In this case, each subcarrier related metric can be weighted by its corresponding CSI estimation. In the decoding of Turbo codes or LDPC codes, an iterative process is usually required, and, in each iteration, the channel reliability information (log-likelihood ratio) is updated and used for the next iteration. In this case, the CSI estimation can be used to weight the channel reliability information.

In fact, although the involved decoding processes may be different, the above mentioned CSI-aided decoding schemes can be treated as being equivalent to using the CSI estimation to linearly weight the input signal of the decoder, i.e., the output signal of the constellation demapper. This has been explicitly shown in [14] (for Viterbi decoder), [15] (for Turbo decoder) and [18] (for LDPC decoder). Being aware of this, one may find that the weighting operations can actually be shifted to the one-tap equalizer. As shown in reference [20]: "W. Li, Z. Wang, Y Yan, M. Tomisawa, "An efficient low-cost LS equalization in COFDM based UWB systems by utilizing channel-state-information (CSI)," in *Proc. IEEE 62nd Veh. Technol. Conf.*, VTC 2005-Fall, Dallas, Tex., USA, September 2005, pp. 2167-2171.", by this way, the complexity involved in equalization can be reduced if the squared magnitude of the estimated CFR, $|\hat{h}_r|^2$, is used as the CSI estimation on subcarrier k. Also, the additional symbol de-interleaver 104 and the bit-wise de-interleaver 105 required for reordering the CSI estimations in FIG. 2 become unnecessary. In this case, the structure of the apparatus 100 in FIG. 2 can be simplified as shown in FIG. 3. Mathematically, the CSI-aided one-tap equalizer 203 of the apparatus 200 shown in FIG. 3 can be expressed as:

$$z_k = \frac{y_k}{\hat{h}_k} \cdot |\hat{h}_k|^2 = y_k [\hat{h}_k]^* \qquad (7)$$

for k=0, 1, . . . , N–1, where [•]* denotes complex conjugate.

Weighting the equalized signal, $y_k/\hat{h}_k$, on each subcarrier by the corresponding squared channel attenuation factor, $|\hat{h}_k|^2$, in (7) can be interpreted as the dual of equalizing the channel in the sense that equalization consists of amplifying an attenuated received signal to match it to the nominal decision levels, whereas weighting consists of matching the decision levels to the received signal attenuation. Weighting in this way clearly avoids the noise enhancement inherent to equalized OFDM systems since a small weighting factor is associated to the equalized signals with low reliability, and a large weighting factor is associated to the equalized signals with high reliability.

Mathematically, the CSI-aided, one-tap equalizer of (7) can be obtained by multiplying the received signal, $y_k$, by the conjugate of the channel estimation, $[\hat{h}_k]^*$, and thus a low-complexity divider-free implementation can be expected. However, when applying (7) to the actual implementation of a COFDM system, this divider-free solution for computational saving may become problematic. This can be explained as follows. As mentioned before, in order to enhance the error correction capability of the channel decoder, a soft-decision demapper is usually involved. The soft-decision demapping implies that the output of demapper (input of channel decoder) should be quantized. The level of quantization accuracy will be limited to a small number of bits. Under this circumstance, the weighting factors (squared channel attenuation factor), $|\hat{h}_k|^2$, need to be normalized, as described in [13]. When the modulation mapping is BPSK or QPSK, the normalization can be either performed in the equalization stage or embedded in the quantization process of the demapper. Both methods require division operations. As a result, the computational saving in the apparatus 200 of FIG. 3 may not be that significant when compared with that in the apparatus 100 of FIG. 2.

Another problem appears when applying the simplified CSI-aided one-tap equalizer of (7) in a COFDM system where the modulation mode is amplitude dependent such as QAM. Basically, the simplified CSI-aided one-tap equalizer 203 of (7) can not work in this case. This is true even when the above mentioned normalization process is added. All these drawbacks have limited the usage of the apparatus 200 of FIG. 3 in practice.

SUMMARY OF THE INVENTION

An object of the present invention is to provide method and apparatus for receiving coded signals with the aid of channel state information (CSI), which can be adaptable to a variety of modulation schemes while maintaining the simplicity of computation.

According to the above-mentioned object, a method for receiving coded signals with the aid of CSI is provided. The method comprises: performing channel estimation to obtain a CFR estimation vector, $\hat{h}=[\hat{h}_0, \hat{h}_1, \ldots, \hat{h}_{N-1}]^T$; computing a squared magnitude of the CFR estimation, $|\hat{h}_k|^2$, on each subcarrier k=0, 1, . . . , N–1, and obtaining a normalization factor $\alpha$ by averaging the squared magnitudes of CFR estimations on all N subcarriers; finding a norm-shift operand m satisfying the condition that $\alpha_0=2^m$ is a power of 2 number closest to the normalization factor $\alpha$; using the norm-shift operand m to perform a CSI-aided one-tap channel equalization on an output signal vector $y=[y_0, y_1, \ldots, y_{N-1}]^T$, which is generated from a discrete Fourier transform (DFT) processor, for achieving an equalized signal vector $z=[z_0, z_1, \ldots, z_{N-1}]^T$; performing constellation demapping; and performing channel decoding.

According to the above-mentioned object, an apparatus for receiving coded signals with the aid of CSI is provided. The apparatus comprises: a CFR estimator for performing channel estimation to achieve a CFR estimation vector $\hat{h}=[\hat{h}_0, \hat{h}_1, \ldots, \hat{h}_{N-1}]^T$; a computation and shift module for obtaining a normalization factor $\alpha$ by averaging squared magnitudes of the CFR estimations on all N subcarriers and further for yielding a norm-shift operand m satisfying the condition that $\alpha_0=2^m$ is a power of 2 number closest to the normalization factor $\alpha$; a DFT processor for performing DFT on a received coded signal vector and generating an output signal vector $y=[y_0, y_1, \ldots, y_{N-1}]^T$; a CSI-aided one-tap equalizer for equalizing the output signal vector $y=[y_0, y_1, \ldots, y_{N-1}]^T$ by using the norm-shift operand m and the CFR estimation vector to generate an equalized signal vector $z=[z_0, z_1, \ldots, z_{N-1}]^T$; a constellation demapper for performing constellation demappering; and a channel decoder for performing channel decoding.

DETAILED DESCRIPTION OF THE INVENTION

The preferred embodiments of the present invention will be described in detail by way of following examples and with reference to the above-mentioned figures.

Figure 4:
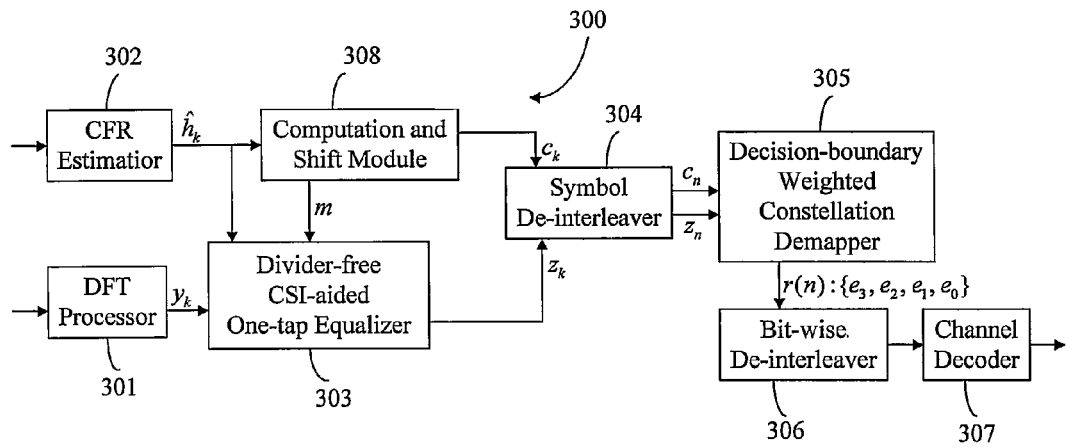
FIG. 4 is a block diagram of an apparatus for receiving coded signals with the aid of CSI in accordance with one embodiment of the present invention.
Figure 6:
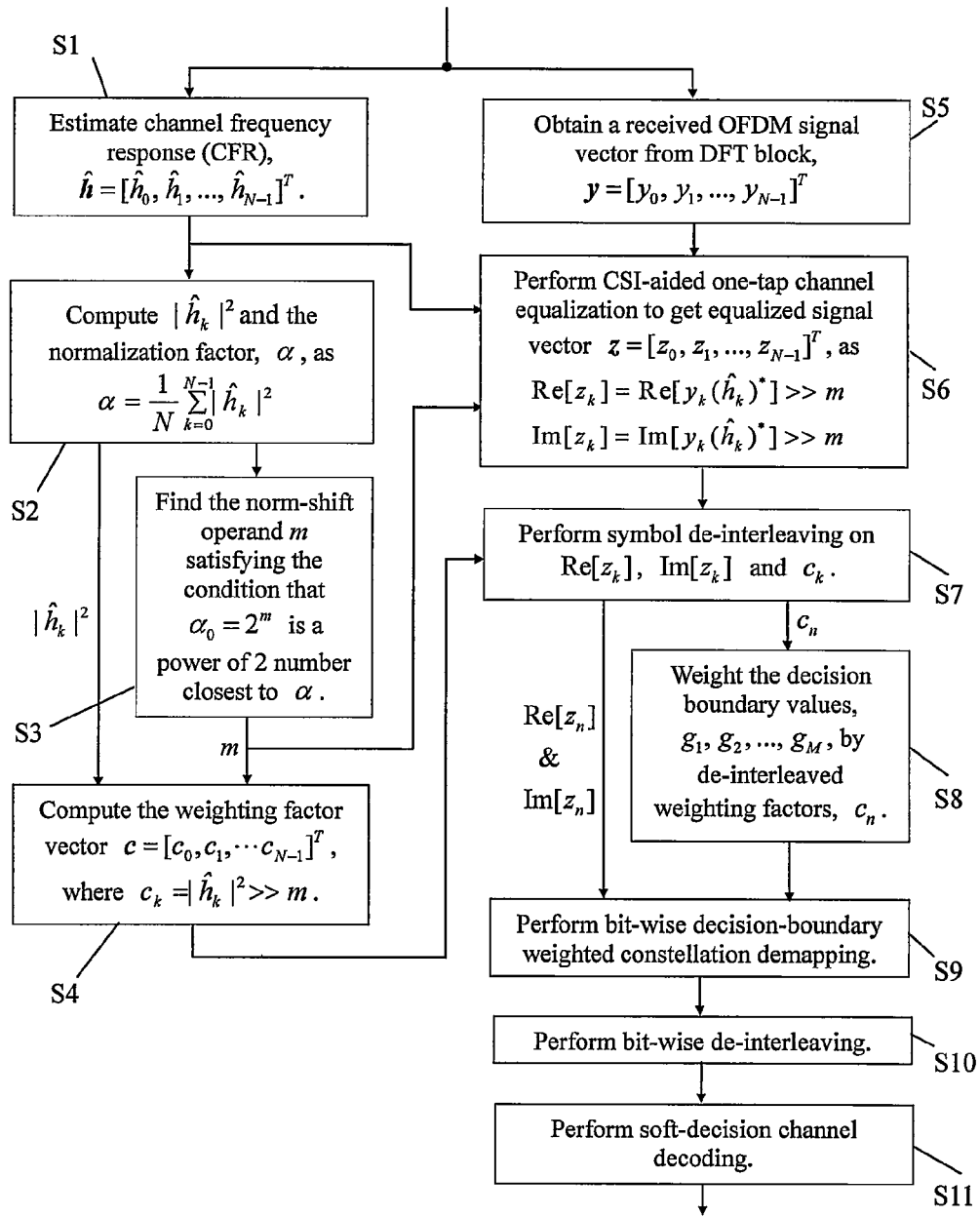
FIG. 6 is a flow chart of a method for receiving coded signals with the aid of CSI in accordance with another embodiment of the present invention.

Referring to FIG. 4 in conjunction with FIG. 6, an apparatus 300 for receiving coded signals with the aid of channel state information (CSI) is provided. The apparatus 300 includes a discrete Fourier transform (DFT) processor 301 for performing DFT on a received coded signal and a channel frequency response (CFR) estimator 302 for obtaining a CFR estimation vector $\hat{h}=[\hat{h}_0, \hat{h}_1, \ldots, \hat{h}_{N-1}]^T$ with a least-square (LS) method or maximum-likelihood (ML) method. The CFR estimation vector $\hat{h}=[\hat{h}_0, \hat{h}_1, \ldots, \hat{h}_{N-1}]^T$ can be obtained either in frequency-domain or in a time-domain followed by a time-domain to frequency-domain transform (see FIG. 1). The squared magnitudes of the CFR estimation, $|\hat{h}_k|^2$, $k=0, 1, \ldots, N-1$, ($\hat{h}_k$ is the CFR estimation on subcarrier k), are used for weighting the received signal, and a normalization factor, $\alpha$, can be obtained by averaging squared magnitudes of CFR estimations on all N subcarriers as:

$$\alpha = \frac{1}{N}\sum_{k=0}^{N-1}|\hat{h}_k|^2. \quad (8)$$

An output signal vector, $y=[y_0, y_1, \ldots, y_{N-1}]^T$, of the DFT processor 301 is applied to a CSI-aided one-tap equalizer for obtaining an equalized signal vector, $z=[z_0, z_1, \ldots, z_{N-1}]^T$. The equalized signal on subcarrier k is obtained as:

$$z_k = \frac{y_k}{\hat{h}_k} \cdot \frac{|\hat{h}_k|^2}{\alpha} = \frac{y_k[\hat{h}_k]^*}{\alpha}, k = 0, 1, \ldots, N-1 \quad (9)$$

The calculation of the normalization factor $\alpha$ is straightforward and can be achieved without using a divider. That is, in actual implementation, the factor 1/N in (8) can be achieved by an arithmetic shift operator, if N is a power of 2 number, or, otherwise, be approximated by an arithmetic shift operator plus a multiplier. However, when comparing (9) with (7), involving the normalization factor $\alpha$ into the CSI-aided equalization process has substantially increased the computational burden as, for each subcarrier, the equalization requires a division operation. Fortunately, the normalization factor $\alpha$ can actually be approximated by rounding it to a power of 2 number, $\alpha_0=2^m$. In other words, $\alpha_0$ is a power of 2 number closest to $\alpha$. Here, m is a non-negative integer and is called the norm-shift operand in sequel. Since $\alpha$ is a positive integer in actual hardware implementation, m can be easily found by first finding $\alpha$'s first non-zero most significant bit (MSB)—denoted as $b_p$ (i.e, the value of the pth bit of $\alpha$), and then computing m as $m=p+b_{p-1}$. (Note, here, $b_0$ is supposed to be the least significant bit (LSB) of $\alpha$).

Applying the norm-shift operand m obtained from the normalization factor $\alpha$ into (9), a divider-free CSI-aided one-tap equalizer 303 is achieved and the equalized output signal on subcarrier k is given by:

$$z_k \approx \frac{y_k}{\hat{h}_k} \cdot \frac{|\hat{h}_k|^2}{\alpha_0} \quad (10)$$

$$= \frac{y_k[\hat{h}_k]^*}{\alpha_0}$$

$$= \text{Re}[y_k(\hat{h}_k)^*] \gg m + j\{\text{Im}[y_k(\hat{h}_k)^*] \gg m\}$$

$k=0, 1, \ldots, N-1$. Here, $\text{Re}[y_k(\hat{h}_k)^*]$ and $\text{Im}[y_k(\hat{h}_k)^*]$ denote the real part and imaginary part of the complex value $y_k(\hat{h}_k)^*$, respectively, and, ">>" stands for the arithmetic right shift, which means that the real and imaginary parts of $z_k$ are obtained by right shifting m bits of the real and imaginary parts of $y_k(\hat{h}_k)^*$ respectively while maintaining their signs.

Define $c_k=|\hat{h}_k|^2 \gg m$, a weighting factor on subcarrier k, which is the approximately normalized squared magnitude of the estimated CFR, $|\hat{h}_k|^2$, on subcarrier k. Similar to the norm-shift operand m, the weighting factor $c_k$ is found in a computation and shift module 308. The divider-free CSI-aided one-tap equalizer 303 of (10) thus can be interpreted by using $c_k$ to scale the output signal, $y_k/\hat{h}_k$, of the conventional equalizer of (6). Since the weighting factor $c_k$ is a scalar which does not change the phase of $y_k/\hat{h}_k$, and thanks to the normalization involved, the resultant equalized signal, $z_k$, can be processed by the subsequent constellation demapper in a straightforward way, provided that BPSK or QPSK modulation demapping is involved. However, in the case of using other modulation demapping schemes such as QAM, which is sensitive to both amplitude and phase of its input signal, the weighting factor $c_k$ caused amplitude variation in the output signal $z_k$ should be taken into consideration in the demapping process. Without loss of generality, here, the 16-QAM constellation mapping/demapping is used as an example for explanation.

Figure 1:
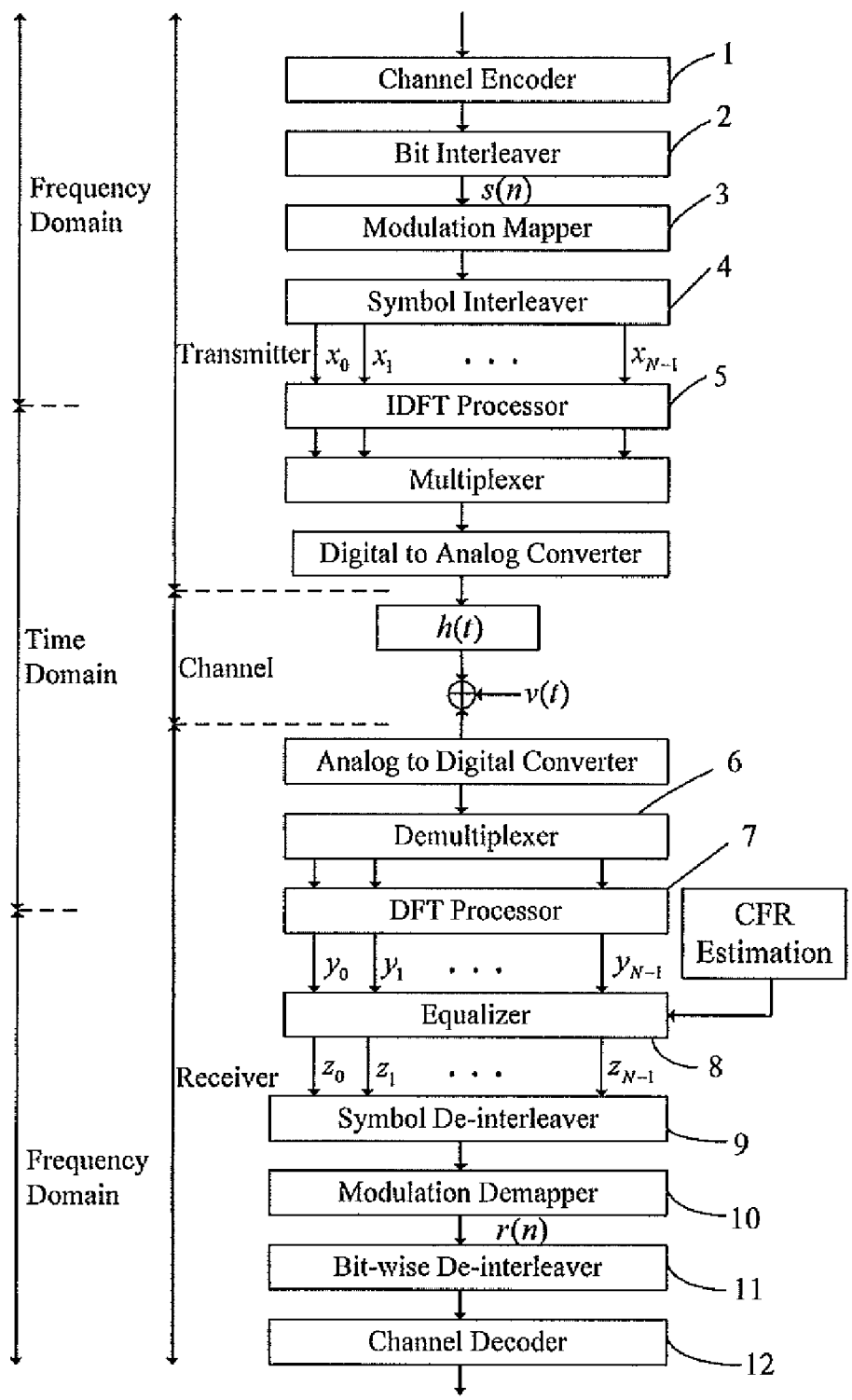
FIG. 1 is a block diagram of a typical COFDM baseband system.
Figure 2:
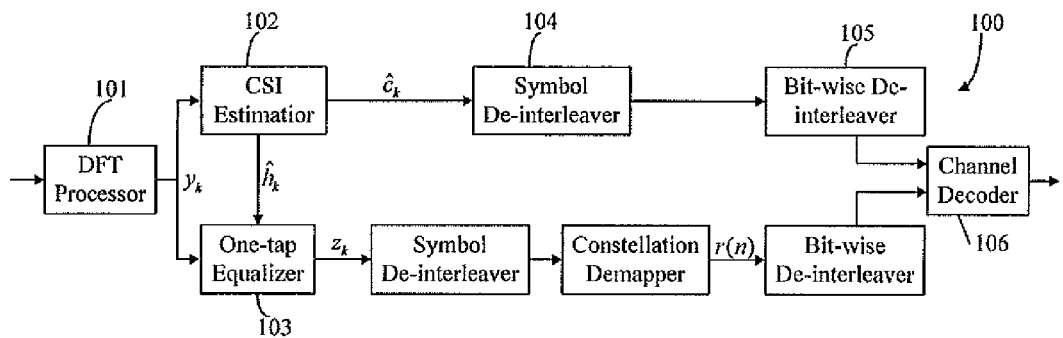
FIG. 2 is a block diagram of a known apparatus for receiving coded signals.
Figure 3:
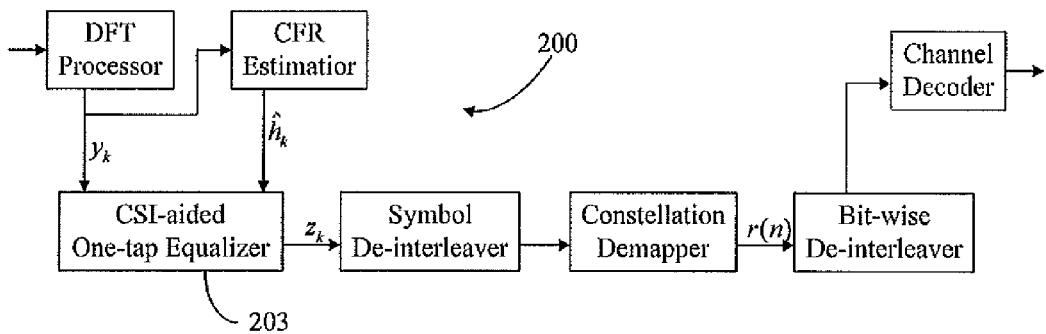
FIG. 3 is a block diagram of another known apparatus for receiving coded signals.
Figure 5:
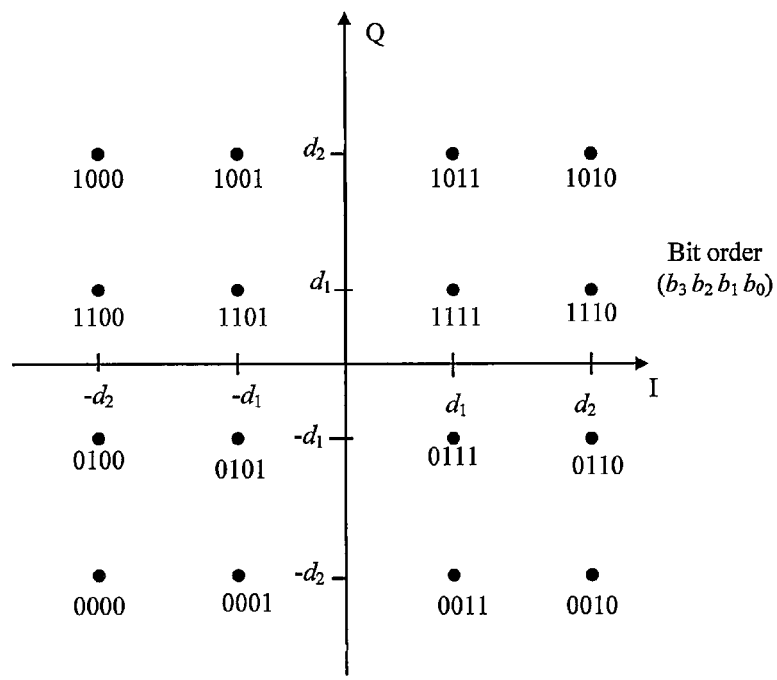
FIG. 5 is a 16-QAM Gray-coded constellation diagram.

Referring to FIG. 1, in the transmitter, the input signals s(n) to the modulation mapper 3 are groups of 4 bits ($b_3$ $b_2$ $b_1$ $b_0$) which are converted into complex numbers (I+jQ) representing 16-QAM constellation points as shown in FIG. 5. The conversion can be performed according to Table 1 in which the commonly used Gray-coded constellation mapping is assumed. In this case, $b_1$ $b_0$ determines the I value (real part corresponding to In-phase component of the modulated signal) and $b_3$ $b_2$ determines the Q value (imaginary part corresponding to Quadrature component of the modulated signal). Depending on the actual values of input bits ($b_3$ $b_2$ $b_1$ $b_0$), the I value and Q value can be one of $\{-d_2, -d_1, d_2, d_1\}$, where $d_1$ and $d_2$ ($d_2 > d_1$) are positive and their actual values shall be specifically given in each individual system. For example, one may set $d_1=2$ and $d_2=6$.

TABLE 1

The mapping method of the 16-QAM IQ constellations
(In-phase/Quadrature)

| Input bits ($b_1 b_0$) | I-out | Output bits ($b_3 b_2$) | Q-out |
|---|---|---|---|
| 00 | $-d_2$ | 00 | $-d_2$ |
| 01 | $-d_1$ | 01 | $-d_1$ |
| 11 | $d_1$ | 11 | $d_1$ |
| 10 | $d_2$ | 10 | $d_2$ |

Referring to FIGS. 4 and 6, in the receiver, the constellation demapping can be performed bit-wisely in a constellation demapper 305. Suppose that the complex number (I+jQ) is the input to the constellation demapper 305, and the demapping output r(n) are represented as four soft-decision values $\{e_3, e_2, e_1, e_0\}$ in correspondence to 4 bits ($b_3\ b_2\ b_1\ b_0$) input of the modulation mapper 3. Denote by $g_1$ and $g_2$ two decision-boundary values with $g_1=0$, $g_2=(d_1+d_2)/2$, the demapping of(I+jQ) to $\{e_3, e_2, e_1, e_0\}$ can be simply obtained as $$e_0 = g_2 - |I|;$$

$$e_1 = I - g_1 = I;$$

$$e_2 = g_2 - |Q|;$$

$$e_3 = Q - g_1 = Q. \quad (11)$$

When the conventional equalizer of (6) is used, i.e., no weighting is involved in the equalization, the bit-wise demapping of (11) has been proved to be quite effective. This is due to the fact that each input signal of the constellation demapper 305 can be assumed to be close to its nominal constellation point if the noise effect is not taken into consideration. However, this assumption becomes invalid if the equalizer involves a weighting process. Recall that the weighting factors, $c_k$, has been used in the divider-free CSI-aided one-tap equalizer 303 of (10). In this case, when applying the equalizer's output signal (I+jQ) to (11), large errors in computing $e_0$ and $e_2$ are expected as the decision boundary value $g_2$ has not been scaled accordingly. With this observation, the bit-wise demapper of (11) can be modified as:

$$e_0 = c_k g_2 - |I_k|;$$

$$e_1 = I_k - c_k g_1 = I_k;$$

$$e_2 = c_k g_2 - |Q_k|;$$

$$e_3 = Q_k - c_k g_1 = Q_k. \quad (12)$$

Here, k=0, 1, ..., N−1, and ($I_k + jQ_k$) is the (I+jQ) value related to subcarrier k. Again, this is a divider-free process. As a result, a truly divider-free implementation of equalization and demapping can be achieved, as shown in FIG. 4. Clearly, here, the CSI information has been not only used in the divider-free CSI-aided one-tap equalizer 303 but also in the constellation demapper 305. This leads to effectively joint equalization and demapping with low implementation complexity. It should be pointed out that, in the case of BPSK or QPSK or any other modulation mode in which the decision boundary is just x-axis or y-axis (e.g., $g_1=0$ in (12)), the information for weighting the decision boundary becomes not necessary.

In this embodiment, the apparatus 300 further comprises a symbol de-interleaver 304 which performs symbol de-interleaving on the real part, $Re[z_k]$, and imaginary part, $Im[z_k]$, of the equalized signal $z_k$ from the divider-free CSI-aided one-tap equalizer 303 and the weighting factor $c_k$ from the computation and shift module 308. If the implementation of symbol de-interleaving is memory based, $c_k$ may be combined with $Re[z_k]$ and/or $Im[z_k]$ for taking full usage of the memory's world-length. The de-interleaved output signal, denoted by $z_n$, and the de-interleaved weighting factor, denoted by $c_n$ from the symbol de-interleaver 304 pass through orderly a constellation demapper 305 (also called decision-boundary weighted constellation demapper for manifesting the weighting on decision boundary values), a bit-wise de-interleaver 306 and a channel decoder 307 for bit-wise soft-decision constellation demapping using weighted decision boundary values, bit-wise de-interleaving and soft-decision channel decoding, respectively. It should be noted that the channel decoder 307 can be Viterbi decoder, Turbo decoder, LDPC decoder, their combinations, or any other decoder which can benefit from using. CSI.

A method for receiving coded signals with the aid of CSI is also provided. The CSI-aided method can be implemented by the above-mentioned apparatus 300 (see FIG. 4). FIG. 6 describes one embodiment of the CSI-aided method which comprises eleven steps, S1~S11. It should be noted that these eleven steps are not necessarily executed in a serial manner as implied by the step indices, S1~S11, otherwise. Referring to FIG. 6, Steps S1~S11 are described in detail as follows:

S1: Performing channel estimation to obtain the CFR estimation vector, $\hat{h}=[\hat{h}_0, \hat{h}_1, \ldots, \hat{h}_{N-1}]^T$;

S2: Computing the squared magnitude of the CFR estimation; $|\hat{h}|^2$, on each subcarrier (k=0, 1, ..., N−1), and obtaining the normalization factor, $\alpha$, by averaging the squared magnitudes of CFR estimations on all N subcarriers:

$$\alpha = \frac{1}{N} \sum_{k=0}^{N-1} |\hat{h}_k|^2;$$

S3: Finding the norm-shift operand m satisfying the condition that $\alpha_0 = 2^m$ is a power of 2 number closest to a;

S4: Computing the weighting factor vector, $c=[c_0, c_1, \ldots, c_{N-1}]^T$ by using $|\hat{h}|^2$ obtained in Step S2, where the weighting factor on subcarrier k is given by $c_k=|\hat{h}_k|^2 >> m$; (In case of a modulation mode whose decision boundaries for demapping are only x-axis and y-axis (e.g., BPSK, QPSK), this step is redundant and can be skipped in actual implementation);

S5: Obtaining a received OFDM signal vector from a DFT processor, $y=[y_0, y_1, \ldots, y_{N-1}]^T$;

S6: Using the norm-shift operand m obtained in Step S3 to perform a divider-free, CSI-aided one-tap channel equalization to get an equalized signal vector $z=[z_0, z_1, \ldots, z_{N-1}]^T$ such that $Re[z_k]=Re[y_k(\hat{h}_k)^*] >> m$, and $Im[z_k]=Im[y_k(\hat{h}_k)^*] >> m$, k=0, 1, ..., N−1;

S7: Performing symbol de-interleaving on $Re[z_k]$, $Im[z_k]$ and $c_k$ to obtain de-interleaved $Re[z_n]$, $Im[z_n]$ and $c_n$, where $c_k$ can be combined with $Re[z_k]$ and/or $Im[z_k]$ to take full usage of the memory's word-length if the implementation of symbol de-interleaving is memory based;

S8: Weighting (multiplying) M decision boundary values, $g_1$, $g_2, \ldots, g_M$, required for the corresponding bit-wise demapping, by the de-interleaved weighting factors, $c_n$, which are obtained from Step S7 (This can be skipped in case of a modulation mode whose decision boundaries for demapping are only x-axis and y-axis, e.g., BPSK, QPSK);

S9: Using the weighted decision boundary values obtained from Step S8 to perform bit-wise soft-decision constellation demapping on Re[$z_n$] and Im[$z_n$], which are obtained from Step S7; Steps S8 and S9 can be implemented in the decision-boundary weighted constellation demapper 305 as shown in FIG. 4;

S10: Performing bit-wise de-interleaving; and

S11: Performing soft-decision channel decoding.

The above-mentioned CSI-aided apparatus and method for receiving coded signals are of low complexity as they jointly perform frequency-domain one-tap equalization and soft-decision demapping, which are all divider-free. The CSI-aided apparatus and method have no limitation on modulation modes, types of channel decoders, with or without interleavers, and thus have a wide use in many COFDM systems. For example, the present invention can be easily extended its use to coded multiple-input multiple-output (MIMO) OFDM systems, and coded orthogonal frequency-division multiple-access (OFDMA) systems.

Moreover, although the discussion and description of the present invention are based on a COFDM (multi-carrier) system, it should be pointed out that the present invention is also applicable to a coded single-carrier transmission system in case that the block-based, frequency-domain equalization can be performed. For example, the present invention can be used when the digital television terrestrial broadcasting system is in a single-carrier operation mode as defined in the China national standard (see reference [4]).

Various modifications to the embodiments of the present invention described above may be made. For example, other modules and processing steps can be added to or substituted for those above. Thus; although the present invention has been described above using particular embodiments, many variations are possible within the scope of the claims, as will be clear to the skilled in the art, without departing from the scope of the present invention.

We claim:

1. A method for receiving coded signals with the aid of channel state information (CSI), comprising:
    performing channel estimation to obtain a channel frequency response CFR estimation vector, $\hat{h}=[\hat{h}_0, \hat{h}_1, \ldots, \hat{h}_{N-1}]^T$;
    computing a squared magnitude of the CFR estimation, $|\hat{h}_k|^2$, on each subcarrier k=0, 1, ..., N−1, and obtaining a normalization factor $\alpha$ by averaging the squared magnitudes of CFR estimations on all N subcarriers;
    finding a norm-shift operand m satisfying the condition that $\alpha_0=2^m$ is a power of 2 number closest to the normalization factor $\alpha$;
    performing a CSI-aided one-tap channel equalization on an output signal vector $y=[y_0, y_1, \ldots, y_{N-1}]^T$ which is generated from a discrete Fourier transform (DFT) processor, for achieving an equalized signal vector $z=[z_0, z_1, \ldots z_{N-1}]^T$ by using the norm-shift operand m;
    performing constellation demapping; and
    performing channel decoding.

2. The method as claimed in claim 1, wherein real and imaginary parts of the equalized signal, $z_k$, on subcarrier k, are respectively achieved by right shifting m bits of real and imaginary parts of $y_k(\hat{h}_k)^*$, where k=0, 1, ..., N−1, $y_k$ is the output signal vector on subcarrier k of the DFT processor, and $(\bullet)^*$ denotes complex conjugate.

3. The method as claimed in claim 1, further comprising: performing symbol de-interleaving on the real and imaginary parts of the equalized signal vector before the step of performing constellation demapping.

4. The method as claimed in claim 1, further comprising: obtaining a weighting factor vector by right shifting m bits of the squared magnitude of the CFR estimation vector before the step of performing constellation demapping.

5. The method as claimed in claim 4, further comprising: performing symbol de-interleaving on the real and imaginary parts of the equalized signal vector and the weighting factor vector before the step of performing constellation demapping.

6. The method as claimed in claim 5, wherein during the step of performing symbol de-interleaving on the real and imaginary parts of the equalized signal vector and the weighting factor vector, the weighting factor vector is combined with the real part and/or the imaginary part of the equalized signal vector.

7. The method as claimed in claim 4, further comprising: multiplying M decision boundary values, $g_1, g_2, \ldots, g_M$ of the equalized signal vector by the weighting factor vector before the step of performing constellation demapping to obtain M weighted decision boundary values.

8. The method as claimed in claim 7, wherein during the step of performing constellation demapping, the equalized signal vector undergoes bit-wise soft-decision constellation demapping using the M weighted decision boundary values; and, subsequently, during the step of performing channel decoding, soft-decision channel decoding.

9. The method as claimed in claim 1, further comprising: performing bit-wise de-interleaving between the two steps of performing constellation demapping and channel decoding.

10. An apparatus for receiving coded signals with the aid of channel state information (CSI), comprising:
    a channel frequency response (CFR) estimator for performing channel estimation to achieve a CFR estimation vector, $\hat{h}=[\hat{h}_0, \hat{h}_1, \ldots, \hat{h}_{N-1}]^T$;
    a computation and shift module for obtaining a normalization factor $\alpha$ by averaging squared magnitudes of the CFR estimations, $|\hat{h}|^2$, k=0, 1, ..., N−1, on all N subcarriers, and further for yielding a norm-shift operand m satisfying the condition that $\alpha_0=2^m$ is a power of 2 number closest to the normalization factor $\alpha$;
    a discrete Fourier transform (DFT) processor for performing a DFT on a received coded signal and generating an output signal vector, $y=[y_0, y_1, \ldots, y_{N-1}]^T$;
    a CSI-aided one-tap equalizer for equalizing the output signal vector, $y=[y_0, y_1, \ldots, y_{N-1}]^T$, by using the norm-shift operand m and the CFR estimations, resulting in an equalized signal vector, $z=[z_0, z_1, \ldots, z_{N-1}]^T$;
    a constellation demapper for performing constellation demapping; and
    a channel decoder for performing channel decoding.

11. The apparatus as claimed in claim 10, wherein the CSI-aided one-tap equalizer achieves real and imaginary parts of the equalized signal, $z_k$, on subcarrier k, by right shifting m bits of real and imaginary parts of $y_k(\hat{h}_k)^*$, respectively, where k=0, 1, ..., N−1, $y_k$ is the output signal on subcarrier k of the DFT processor, and $(\bullet)^*$ denotes complex conjugate.

12. The apparatus as claimed in claim 10, wherein the computation and shift module is further arranged to obtain a weighting factor vector by right shifting m bits of the squared magnitude of the CFR estimation vector.

13. The apparatus as claimed in claim 12, wherein the constellation demapper uses the weighted decision boundary values, resultant from multiplying decision boundary values of the equalized signal vector by the weighting factor vector.

14. The apparatus as claimed in claim 10, further comprising: a symbol de-interleaver, located between the CSI-aided one-tap equalizer and the constellation demapper, for performing symbol de-interleaving.

15. The apparatus as claimed in claim 10, further comprising: a bit-wise de-interleaver, located between the constellation demapper and the channel decoder, for performing bit-wise de-interleavering.

16. The apparatus as claimed in claim 10, wherein the channel decoder performs soft-decision channel decoding.

* * * * *